United States Patent
Konishi et al.

(10) Patent No.: US 9,858,692 B2
(45) Date of Patent: Jan. 2, 2018

(54) TEST SUPPORT APPARATUS, TEST SUPPORT METHOD, AND TEST SUPPORT PROGRAM FOR PLANT MONITORING SYSTEM

(71) Applicant: KABUSHIKI KAISHA TOSHIBA, Minato-Ku (JP)

(72) Inventors: Tadao Konishi, Fuchu (JP); Motoko Yoshida, Kawasaki (JP); Naoto Odagawa, Hachioji (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/571,749

(22) Filed: Dec. 16, 2014

(65) Prior Publication Data

US 2015/0199831 A1    Jul. 16, 2015

(30) Foreign Application Priority Data

Jan. 14, 2014 (JP) .................. 2014-004522

(51) Int. Cl.
```
G06T 11/20      (2006.01)
G05B 23/02      (2006.01)
G21C 17/00      (2006.01)
```
(52) U.S. Cl.
CPC ........ G06T 11/206 (2013.01); G05B 23/0272 (2013.01); G21C 17/00 (2013.01); *G05B 2219/31316* (2013.01)

(58) Field of Classification Search
CPC ... G06T 5/009; G06T 11/206; G05B 23/0272; G05B 2219/31316; G21C 17/00
See application file for complete search history.

(56) References Cited

U.S. PATENT DOCUMENTS

| 8,698,831 B2 * | 4/2014 | Kato ...................... G06T 5/009 345/589 |
| 8,736,679 B2 * | 5/2014 | Jackson ................. G01C 23/00 348/123 |
| 2008/0120522 A1 | 5/2008 | Puri et al. |

(Continued)

FOREIGN PATENT DOCUMENTS

| JP | 2000-20122 A | 1/2000 |
| JP | 2000-242328 A | 9/2000 |

(Continued)

OTHER PUBLICATIONS

Extended European Search Report dated Jun. 5, 2015 in European Patent Application No. 15150406.5.

*Primary Examiner* — Robert Craddock
(74) *Attorney, Agent, or Firm* — Oblon, McClelland, Maier & Neustadt, L.L.P.

(57) ABSTRACT

A test support apparatus for a plant monitoring system, includes: a list holding unit configured to hold a test list which describes at least a plurality of test items and information about a testing sequence for the test items; a screen generating unit configured to generate a display screen provided based on an output signal from a control unit which controls a plurality of connected devices; a data acquisition instructing unit configured to give instructions to acquire image data of the display screen based on the testing sequence in the test list; and a data linking unit configured to link the acquired image data to the test items on the test list.

8 Claims, 7 Drawing Sheets

(56) References Cited

U.S. PATENT DOCUMENTS

2011/0055632 A1    3/2011  Zimmerman
2013/0194277 A1*   8/2013  Takishima ................ G06T 3/40
                                                           345/472

FOREIGN PATENT DOCUMENTS

| JP | 2007-149070 A | 6/2007 |
| JP | 2011-75824 | 4/2011 |
| JP | 2011-164727 A | 8/2011 |
| JP | 2012-226683 A | 11/2012 |
| JP | 2013-96838 A | 5/2013 |
| JP | 2013-97640 | 5/2013 |
| JP | 2013-148617 | 8/2013 |
| JP | 2013-156875 A | 8/2013 |
| WO | WO 2009/046525 A1 | 4/2009 |

\* cited by examiner

FIG. 1

< TEST LIST >

| TESTING SEQUENCE | TEST ITEM | DECISION | IMAGE DATA LINK |
|---|---|---|---|
| 1 | | | |
| 2 | | | |
| 3 | | | |

< TEST LIST >

| TESTING SEQUENCE | TEST ITEM | CONTROL UNIT | DECISION | IMAGE DATA LINK |
|---|---|---|---|---|
| 1 | | | | |
| 2 | | | | |
| 3 | | | | |

< TEST LIST >

| TESTING SEQUENCE | TEST ITEM | DECISION | IMAGE DATA LINK | OUTPUT SIGNAL LINK |
|---|---|---|---|---|
| 1 | | | | |
| 2 | | | | |
| 3 | | | | |

< TEST LIST >

| TESTING SEQUENCE | TEST ITEM | DECISION | IMAGE DATA LINK | OUTPUT SIGNAL LINK | PHOTOGRAPHIC DATA LINK |
|---|---|---|---|---|---|
| 1 | | | | | |
| 2 | | | | | |
| 3 | | | | | |

< TEST LIST >

| TEST ITEM | MOUSE OPERATION INFORMATION ||| KEYBOARD OPERATION INFORMATION ||
|---|---|---|---|---|---|
| | MOUSE ID | SPECIFIED COORDINATES | CLICK INFORMATION | KEYBOARD ID | INPUT TEXT |
| | | | | | |
| | | | | | |

TEST SUPPORT APPARATUS, TEST SUPPORT METHOD, AND TEST SUPPORT PROGRAM FOR PLANT MONITORING SYSTEM

BACKGROUND OF THE INVENTION

Field of the Invention

An embodiment of the present invention relates to a test support technique for a plant monitoring system.

Description of the Related Art

Generally, a monitoring system in an electric power plant is made up of a plural control units and is able to display a screen for use to monitor process signals and operational status of various pieces of equipment for each control unit.

Also, some of the screens may be different from one control unit to another while other screens may be common to control units.

Hundreds of types of display screen are used in a large-scale electric power plant system.

In verification testing of display screen contents in such a plant system, it is common practice that based on a test manual, an examiner sets testing conditions and verifies display contents of each screen by operating the screen.

Also, in the case of a plant monitoring system with high quality requirements, it is necessary to store all verified screens as evidence of test results.

To store such image data, hard copies of the screens displayed during testing are printed.

Also, hard copies of test screens are stored as evidence of test results not only in screen verification testing, but also in other testing such as function testing.

Also, in on-site verification testing of hardware recovery, cable connections, or the like, photographs taken and other data are sometimes recorded.

Under these circumstances, techniques for improving efficiency of a display screen verification operation during testing have been developed (e.g., Japanese Patent Laid-Open Nos. 2013-148617, 2011-75824, and 2013-97640).

SUMMARY OF THE INVENTION

These related techniques do not make any particular mention of collection and organization of image data which provides evidence of test results.

Thus, in relation to screen verification during testing of a conventional plant monitoring system, hard copies of the verified screens are printed and stored as evidence of the test results.

Now, the display screens of a plant monitoring system to be tested include plural screens such as data input screens, operation screens, and monitoring screens.

The test manual does not describe details of the screens to be stored and the type and number of stored screens vary among examiners.

Also, after the testing, the stored image data needs to be organized and stored for each test item. However, with a large-scale electric power plant, the image data to be stored exceeds 4,000 images, requiring an immense amount of time for data organization operations.

There may be a case where an omission in image data capture is noticed during a data organization operation after the testing, resulting in a need for retesting in order to capture image data again.

Also, there are circumstances under which a plant monitoring system with high quality requirements does not allow a test program to be added to software installed on an apparatus body included in the system or allow a database maintained by the apparatus to be accessed.

An embodiment of the present invention has been implemented in view of these circumstances and has an object to provide a test support technique for a plant monitoring system, the test support technique being capable of efficiently obtaining high-quality test results free of variations.

DETAILED DESCRIPTION OF THE PREFERRED EMBODIMENTS

First Embodiment

Embodiments of the present invention will be described below with reference to the accompanying drawings.

Figure 1:
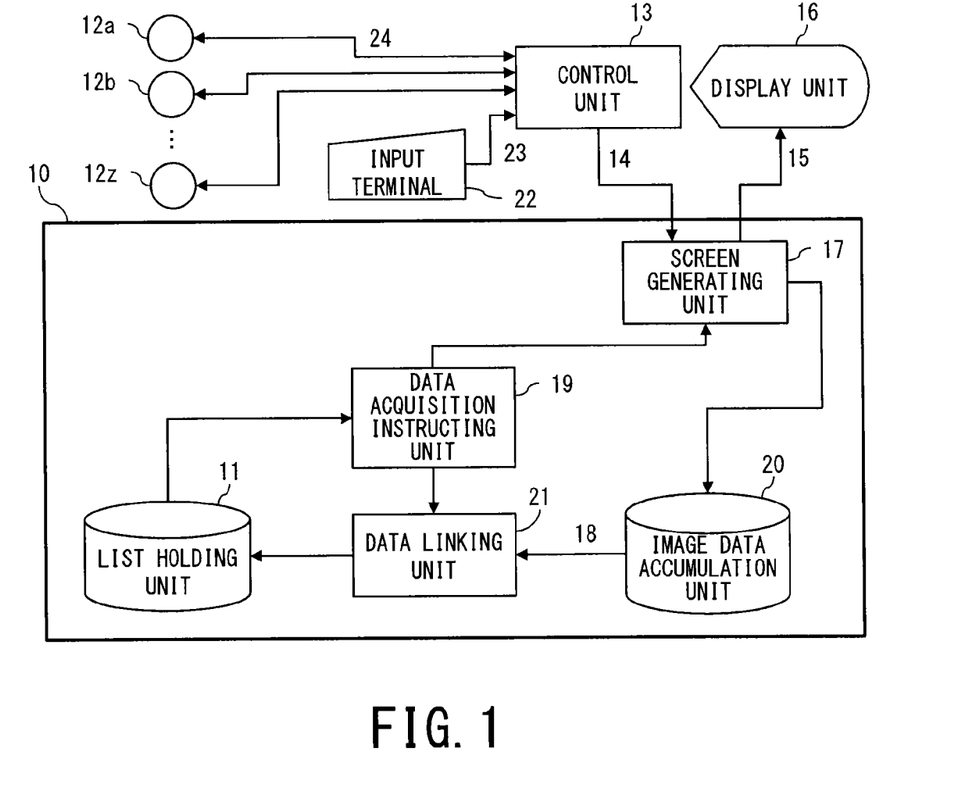
FIG. 1 is a block diagram showing a test support apparatus for a plant monitoring system according to a first embodiment of the present invention.
Figure 2:
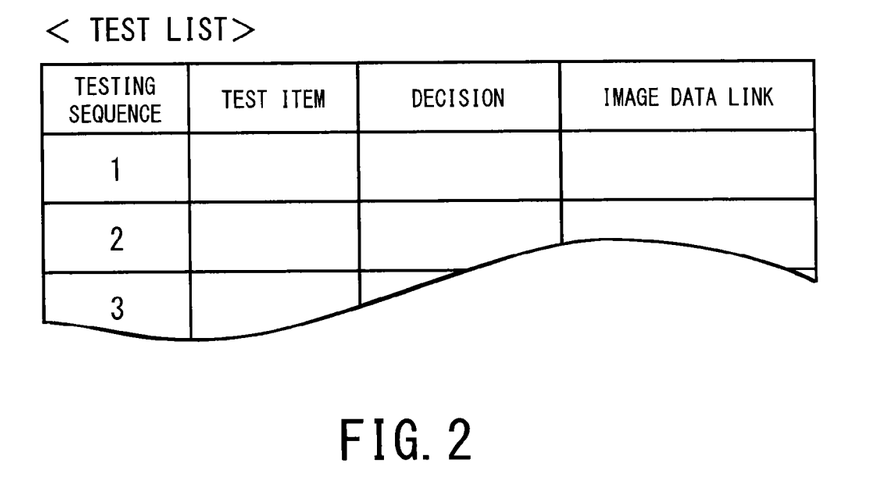
FIG. 2 is a table showing a test list used by the test support apparatus for a plant monitoring system according to the first embodiment.

As shown in FIG. 1, a test support apparatus 10 for a plant monitoring system according to a first embodiment of the present invention (hereinafter also referred to simply as a "support apparatus 10") includes a list holding unit 11 configured to hold a test list (FIG. 2) which at least describes a plurality of test items and information about a testing sequence of the test items, a screen generating unit 17 configured to generate a display screen 15 provided based on an output signal 14 from a control unit 13 which controls plural connected devices 12 (12a, 12b . . . 12z), a data acquisition instructing unit 19 configured to give instructions to acquire image data 18 for the display screen 15 based on the testing sequence in the test list (FIG. 2), and a data linking unit 21 configured to link the acquired image data 18 to the test items on the test list (FIG. 2).

In a complicated process plant such as a nuclear power plant, process signals 24 inputted and outputted to/from thousands of devices 12 (e.g., pumps, thermometers, and on-off valves) are gathered to plural control units 13.

Individual control units 13 are connected to a common network and configured to allow operators in a control center to operate the devices 12 and monitor the process signals 24.

Based on the process signals 24, a display screen laid out according to a display method such as digital display, bar chart display, and trend graph display is presented on a screen installed in the control center.

By operating an input terminal, the operator changes the display screen or enters a command to obtain desired information about plant status or change the plant status.

Each of the plural control units 13 installed in the nuclear power plant in this way is designed to be outfittable with an operation signal input terminal 22 and screen display unit 16.

Consequently, the control unit 13 is designed to be able to be tested separately by being cut off from the network during plant shutdown inspection, during receiving inspection, or the like.

In a test list data sheet shown in FIG. 2, each ordinal position in a testing sequence is associated with a cell describing a test item, a cell for use to enter a decision, and a cell for use to link image data 18. Also, in some cases, each test item may be associated with a cell describing a judgment criterion (not shown).

The control unit 13 is connected with the plural devices 12 (12a, 12b . . . 12z) to be controlled as well as with the input terminal 22 for operation signals 23.

For example, if the device 12 is an on-off valve, when the input terminal 22 is operated, the control unit 13 can switch the on-off valve between an open state and closed state by sending a process signal 24.

Furthermore, a process signal 24 resulting from detection of an open state/closed state of the on-off valve is received by the control unit 13.

The process signal 24 received by the control unit 13 is outputted as an output signal 14 transmittable via a network.

Based on the output signal 14 received from the control unit 13, the screen generating unit 17 generates the display screen 15 on which a digital display, bar chart display, trend graph display, and/or the like are laid out and presents the display screen 15 on the display unit 16.

The data acquisition instructing unit 19 reads a test list (FIG. 2) from the list holding unit 11, and instructs the screen generating unit 17 to acquire a hard copy (image data 18) of the display screen 15 displayed on the display unit 16 at each position in the testing sequence.

The image data 18 of the display screen 15 is assigned an identification ID associated with its position in the testing sequence on the test list and is accumulated in an accumulation unit 20.

The data linking unit 21 links the image data 18 accumulated in the accumulation unit 20 to the test items on the test list (FIG. 2) using the assigned ID as a key.

The examiner reads the test list (FIG. 2), checks the test item (and judgment criterion as well in some cases) and the linked image data 18, and records a pass/fail decision in the decision field.

Thus, in the first embodiment, during testing of the control unit 13, software and databases installed on the control unit 13 are not changed or accessed. Furthermore, the image data 18 of display screens which provides evidence of testing can be acquired and stored by being linked automatically to appropriate test items on the test list.

This eliminates the need to print a hard copy of the current display screen each time as evidence of test verification results and saves the trouble of linking the printed image data to the test items.

That is, each time a test item is carried out according to the established testing sequence, the image data of the display screen is recorded automatically by being linked to the test item, and therefore, improving efficiency of testing operations and eliminating the need for back-tracking due to an omission in acquiring a screen hard copy are possible.

Furthermore, since there is no need to manually link screen hard copies to positions in the testing sequence after testing, it is possible to improve operating efficiency of data organization and prevent human factor errors.

Second Embodiment

Figure 3:
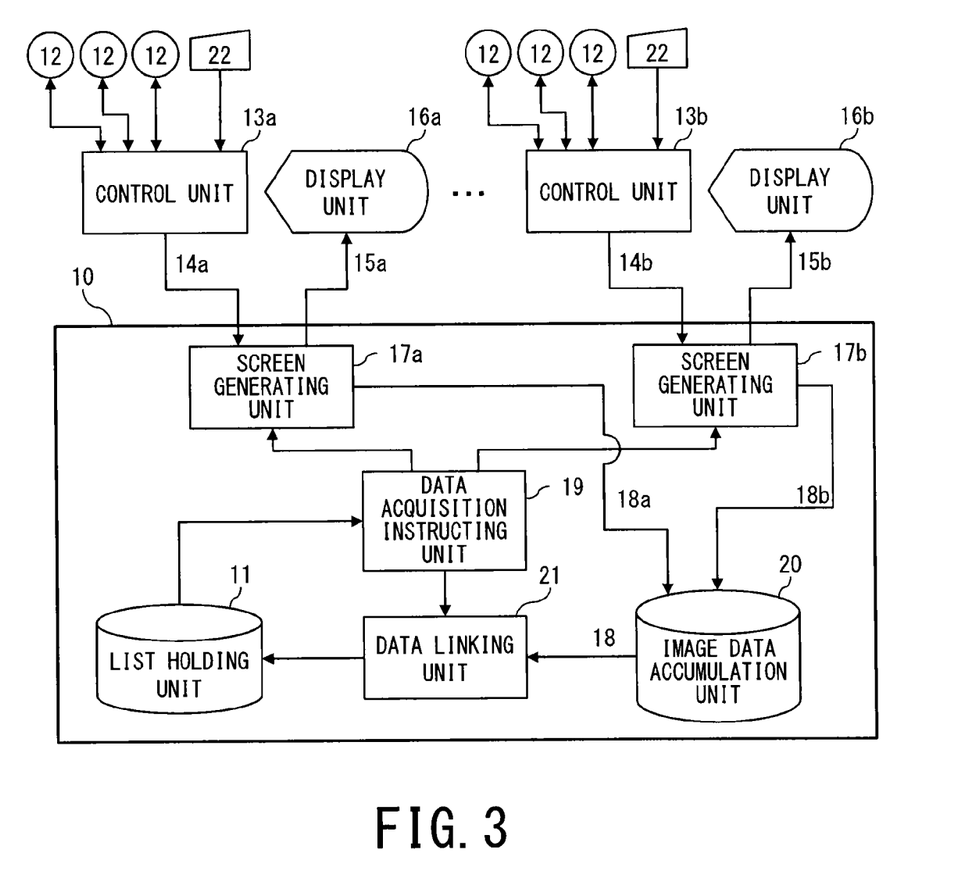
FIG. 3 is a block diagram showing a test support apparatus for a plant monitoring system according to a second embodiment of the present invention.
Figure 4:
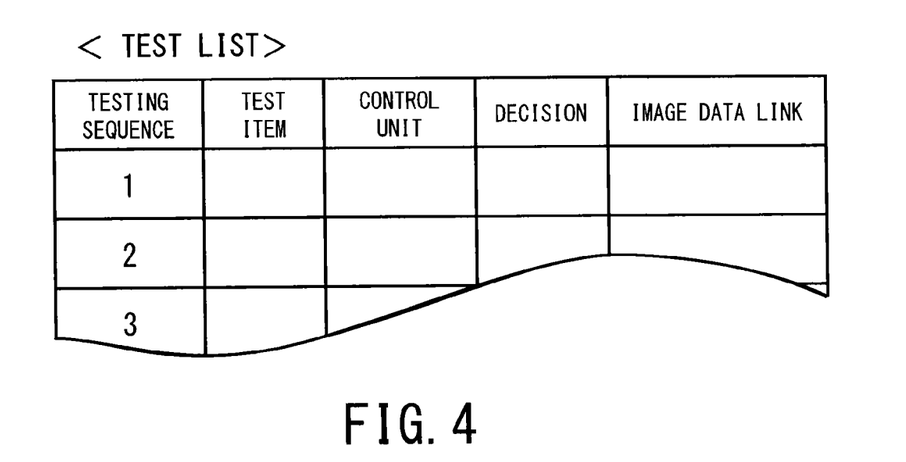
FIG. 4 is a table showing a test list used by the test support apparatus for a plant monitoring system according to the second embodiment.

As shown in FIG. 3, in a test support apparatus 10 for a plant monitoring system according to a second embodiment, the plural control units 13 (13a, 13b) are provided with respective screen generating units 17 (17a, 17b), the test list (FIG. 4) further describes the control units 13 to be tested, and the data acquisition instructing unit 19 causes image data 18 (18a, 18b) of display screens 15 (15a, 15b) generated by the respective screen generating units 17 (17a, 17b) to be acquired based on the testing sequence in the test list (FIG. 4).

Note that in FIG. 3, common components or functions with FIG. 1 are denoted by the same reference numerals as the corresponding components or functions is FIG. 1, and redundant description thereof will be omitted. Also, although only two control units 13 to be tested are illustrated in FIG. 3, there is no particular limit to the number of control units 13.

With this configuration, the screen generating units 17 are provided according to the number of control units 13 to be tested.

Then, the data acquisition instructing unit 19 accumulates the image data 18 (18a, 18b) of the display screens of appropriate control units 13 in the accumulation unit 20 according to the testing sequence in the read test list (FIG. 4).

Note that the number of control units 13 to be tested at each position in the testing sequence is not limited to one. When two or more control units 13 are to be tested at one position in the testing sequence, plural items of image data 18 are linked to one test item.

Consequently, tests on the plural control units 13 (13a, 13b) can be conducted successively and managed using a single test list.

Alternatively, the plural control units 13 linked together in an autonomously distributed manner on the network can be tested off-line and evidence obtained thereby can be recorded.

Third Embodiment

Figure 5:
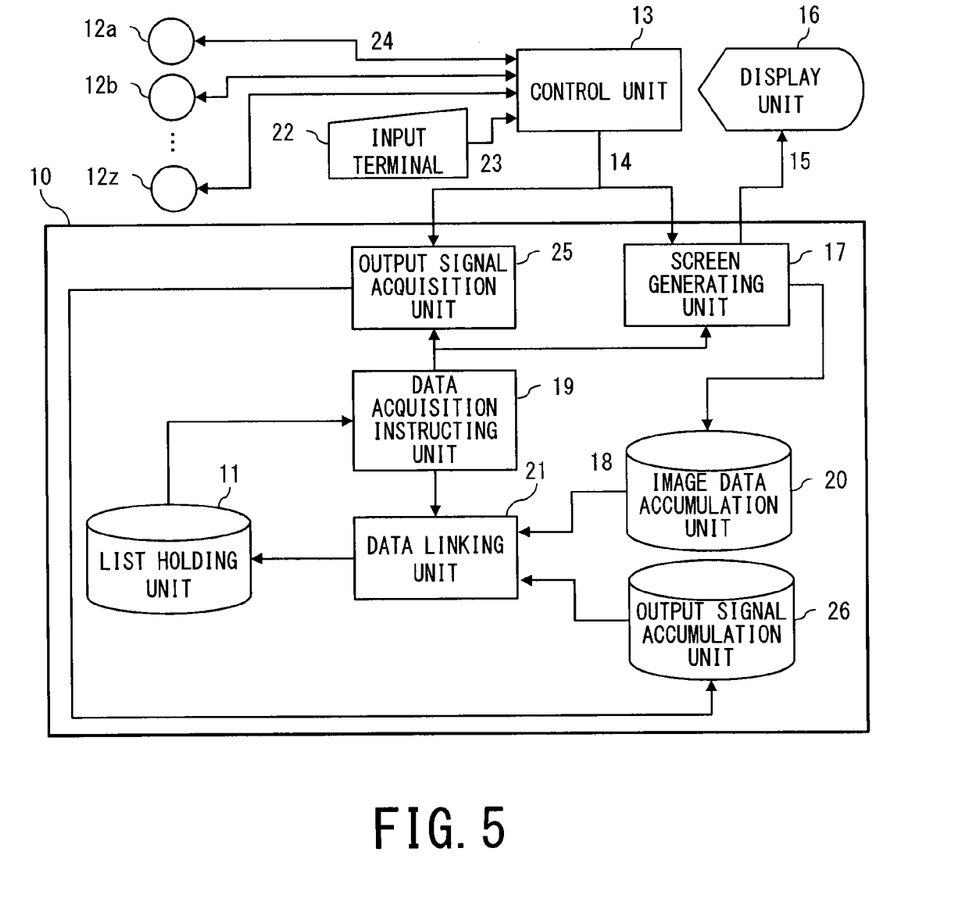
FIG. 5 is a block diagram showing a test support apparatus for a plant monitoring system according to a third embodiment of the present invention.
Figure 6:
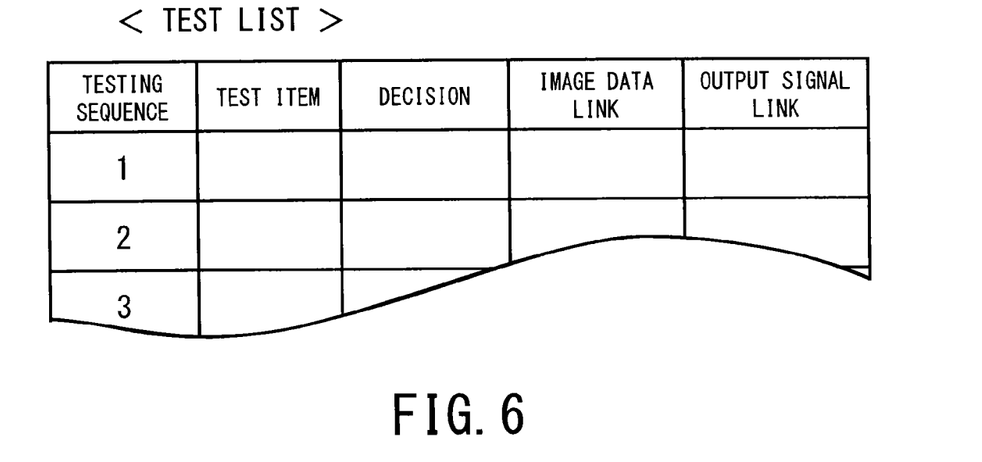
FIG. 6 is a table showing a test list used by the test support apparatus for a plant monitoring system according to the third embodiment.

As shown in FIG. 5, a test support apparatus 10 for a plant monitoring system according to a third embodiment, further includes an output signal acquisition unit 25 configured to acquire an output signal 14 which provides a basis for the display screen 15, and the data linking unit 21 links the acquired output signal 14 to the test items on the test list (FIG. 6).

Note that in FIG. 5, common components or functions with FIG. 1 are denoted by the same reference numerals as the corresponding components or functions is FIG. 1, and redundant description thereof will be omitted. Also, although only one control unit 13 to be tested is illustrated in FIG. 5, there is no particular limit to the number of control units 13.

Here, each output signal 14 is assigned a unique identification ID defined on the side of the control unit 13 and concrete examples of the output signal 14 include ON/OFF information about each device 12, digital information about the presence or absence of an alarm, and numerical information about each process signal 24 (temperature, pressure, flow rate, or the like).

Some of parameter values, ON/OFF information, and the like displayed on the display screen 15 are calculated based on a number of output signals 14 not displayed on the screen or are displayed based on logic conditions.

Thus, in synchronization with issuance of instructions to acquire image data 18 of the display unit 16, the data acquisition instructing unit 19 instructs the output signal acquisition unit 25 to acquire output signals 14 which provide a basis for generating the image data 18. The output signals 14 thus acquired are assigned an identification ID associated with the position in the testing sequence in the test list and accumulated in an accumulation unit 26.

Then, the data linking unit 21 links the output signals 14 accumulated in the accumulation unit 26 to the test items on the test list (FIG. 6) using the assigned identification IDs as keys.

With this configuration, in relation to each test item, the output signals 14 used as the basis for generating the display screen 15 can be recorded and managed together as evidence.

Consequently, when there is something abnormal with test results, since the output signals 14 of the control unit 13 which provide a basis for the test results have been recorded, clues to investigating a cause are available.

If the output signals 14 of the control unit 13 have not been recorded unlike the above case, it becomes necessary, in investigating the cause, to conduct replication tests to isolate a problem by determining whether the abnormal test results have been caused by a problem with simulation values of internal signals or a problem with logic conditions or a calculation method of screen display.

Fourth Embodiment

Figure 7:
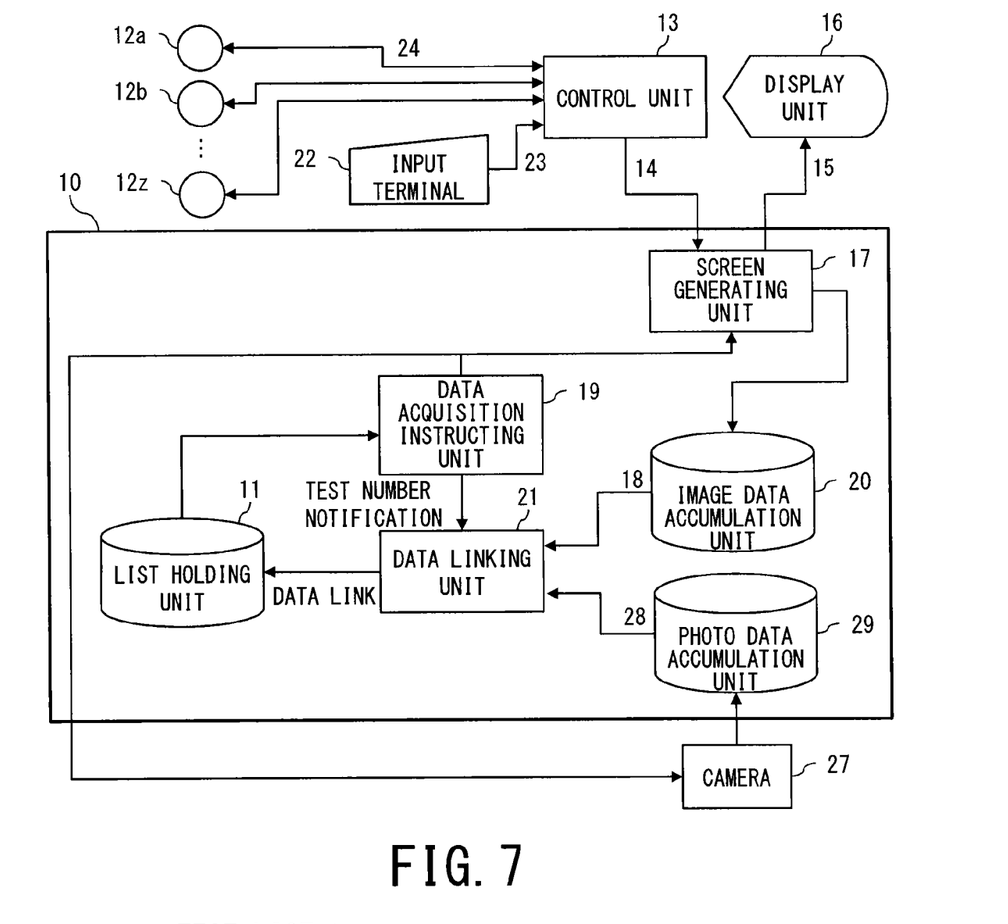
FIG. 7 is a block diagram showing a test support apparatus for a plant monitoring system according to a fourth embodiment of the present invention.
Figure 8:
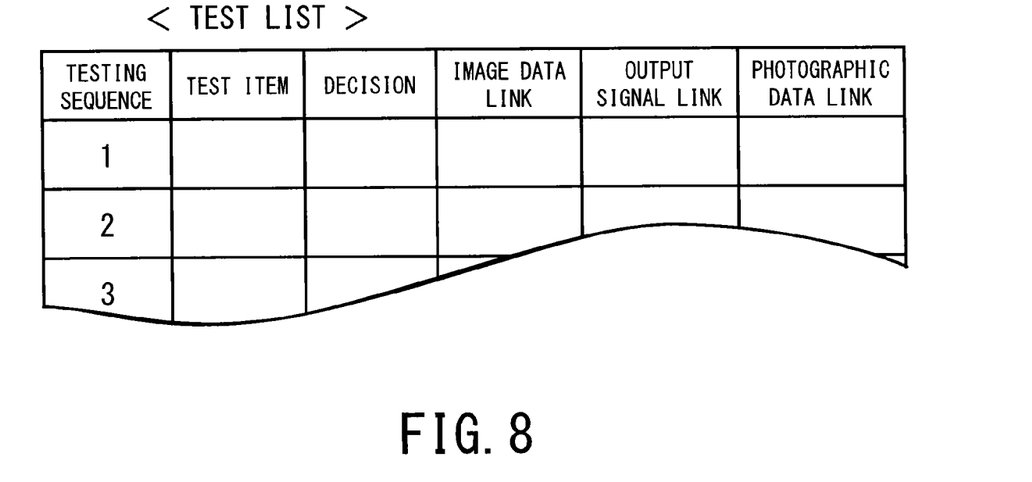
FIG. 8 is a table showing a test list used by the test support apparatus for a plant monitoring system according to the fourth embodiment.

As shown in FIG. 7, in a test support apparatus 10 for a plant monitoring system according to a fourth embodiment of the present invention, the data acquisition instructing unit 19 gives instructions to acquire photographic data 28 using a camera 27 based on the testing sequence in the test list, and the data linking unit 21 links the acquired photographic data 28 to the test items on the test list (FIG. 8).

The photographic data 28, such as still images and moving images taken by the camera 27, is accumulated in an accumulation unit 29.

Note that in FIG. 7, common components or functions with FIG. 1 are denoted by the same reference numerals as the corresponding components or functions is FIG. 1, and redundant description thereof will be omitted. Also, although only one control unit 13 to be tested is illustrated in FIG. 7, there is no particular limit to the number of control units 13.

With this configuration, verification testing of hardware conditions such as lighting conditions of lamps installed in the plant as well as on-site hardware recovery testing can be managed based on the photographic data 28 from the camera 27.

Here, the camera 27 may be a separate device independent of the test support apparatus 10 or may be incorporated into a mobile terminal which constitutes the test support apparatus 10.

When the camera 27 is portable, the data acquisition instructing unit 19 instructs the examiner to photograph a target object using the camera 27 according to the testing sequence in the read test list (FIG. 8).

When the camera 27 is fixed in a neighborhood of the target object, the data acquisition instructing unit 19 releases a shutter of the camera 27 or takes a video recording according to the testing sequence in the read test list (FIG. 8).

The photographic data 28 thus obtained as a result of photo-taking is assigned an identification ID associated with the position in the testing sequence in the test list and transferred to the accumulation unit 29 and accumulated there.

Then, the data linking unit 21 links the photographic data 28 accumulated in the accumulation unit 29 to the test items on the test list (FIG. 8) using the assigned identification ID as a key.

This makes it possible to record evidence of testing on the conditions of hardware installed at the plant rather than relying solely on visual checks made by the examiner and on examiner's memory.

Furthermore, it is possible to manage the photographic data 28 efficiently without spending much time on organization and thereby improve traceability of test results.

Also, in on-site hardware recovery testing, outside cables from other control devices are connected to the control unit on site and verifying evidence that connections are made according to drawings is left in the form of images.

Fifth Embodiment

Figure 9:
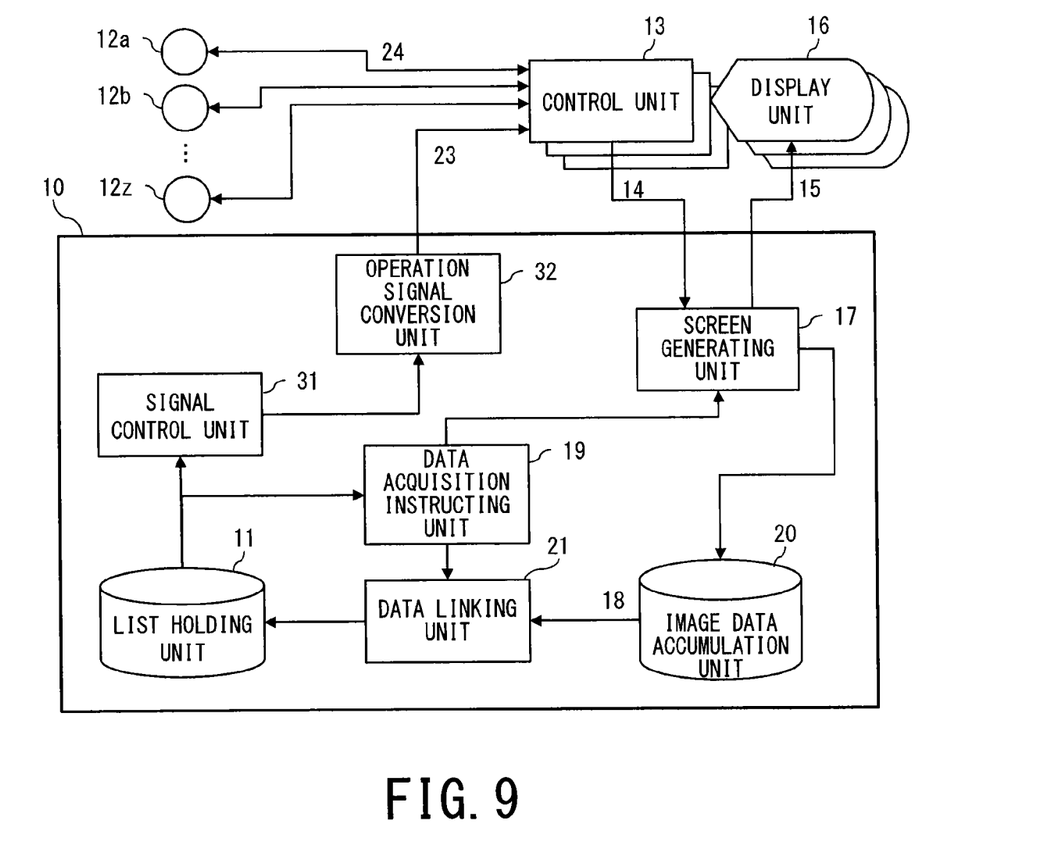
FIG. 9 is a block diagram showing a test support apparatus for a plant monitoring system according to a fifth embodiment of the present invention.

As shown in FIG. 9, in a test support apparatus 10 for a plant monitoring system according to a fifth embodiment, the list holding unit 11 holds an operation list (FIG. 10) which describes operation information about the control units 13 by associating the operation list with the test items. Besides, the test support apparatus 10 further includes a signal control unit 31 configured to input an operation signal 23 converted from the operation information to the control unit 13 based on the testing sequence in the test list (FIG. 4).

Note that in FIG. 9, common components or functions with FIG. 1 are denoted by the same reference numerals as the corresponding components or functions is FIG. 1, and redundant description thereof will be omitted. Also, although only one control unit 13 to be tested is illustrated in FIG. 9, there is no particular limit to the number of control units 13.

With this configuration, inputs of the operation signal 23 entered by the examiner via the input terminal 22 in the first to fifth embodiments are automated based on the operation list (FIG. 10) in the fifth embodiment.

Figure 10:
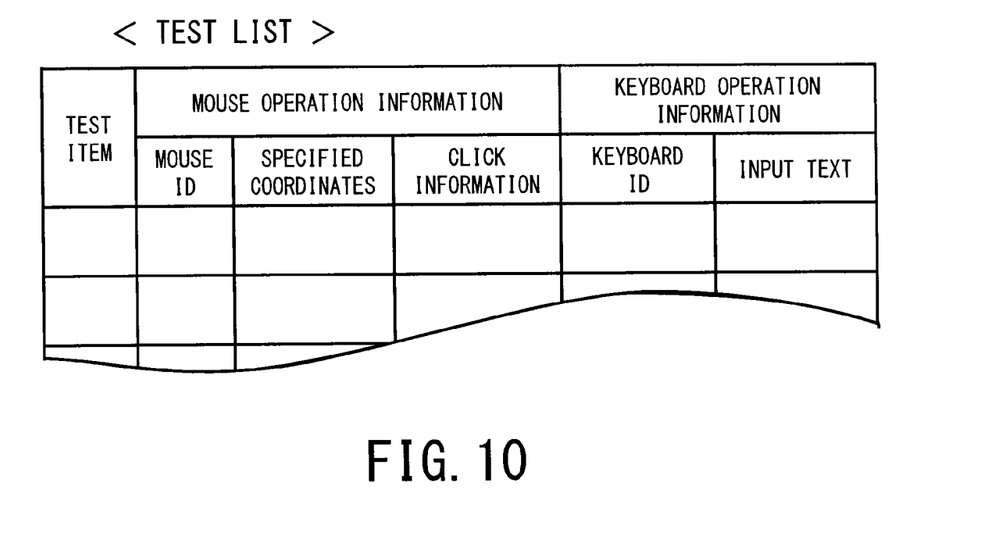
FIG. 10 is a table showing an operation list used by the test support apparatus for a plant monitoring system according to the fifth embodiment.

As shown in FIG. 10, for each test item, the operation list describes operation information (mouse ID, specified coordinates, click information, keyboard ID, input information) used to identify operation of input terminals (mouse, keyboard, and the like) in relation to the test item.

Based on the testing sequence in the test list (FIG. 2) read from the list holding unit 11, the signal control unit 31 reads appropriate operation information from the operation list (FIG. 10) and transfers the operation information to a conversion unit 32.

The operation signal conversion unit 32 converts the transferred operation information into an operation signal 23 readable by the control units 13 and sends the operation signal 23 to the control units 13.

Note that the data acquisition instructing unit 19 operates in synchronization with the signal control unit 31 in relation to a specified position in the testing sequence, and then the image data 18 of the display screen 15 displayed according to operation information in the operation list (FIG. 10) links to the specified position in the testing sequence.

Consequently, operation (button operation on the screen and keyboard input) of the control unit 13 during verification testing of the display screen is performed automatically without examiner intervention.

For example, in performing verification testing of eight control units 13, whereas conventionally it is necessary that eight examiners operate respective control units 13 and verify display contents of the display screens, the fifth embodiment allows a single examiner to perform the verification testing by operating all the eight control units 13 together.

This makes it possible to cut the staff of examiners sharply and prevent oversights and misreadings in visual checks made by examiners.

Sixth Embodiment

Figure 11:
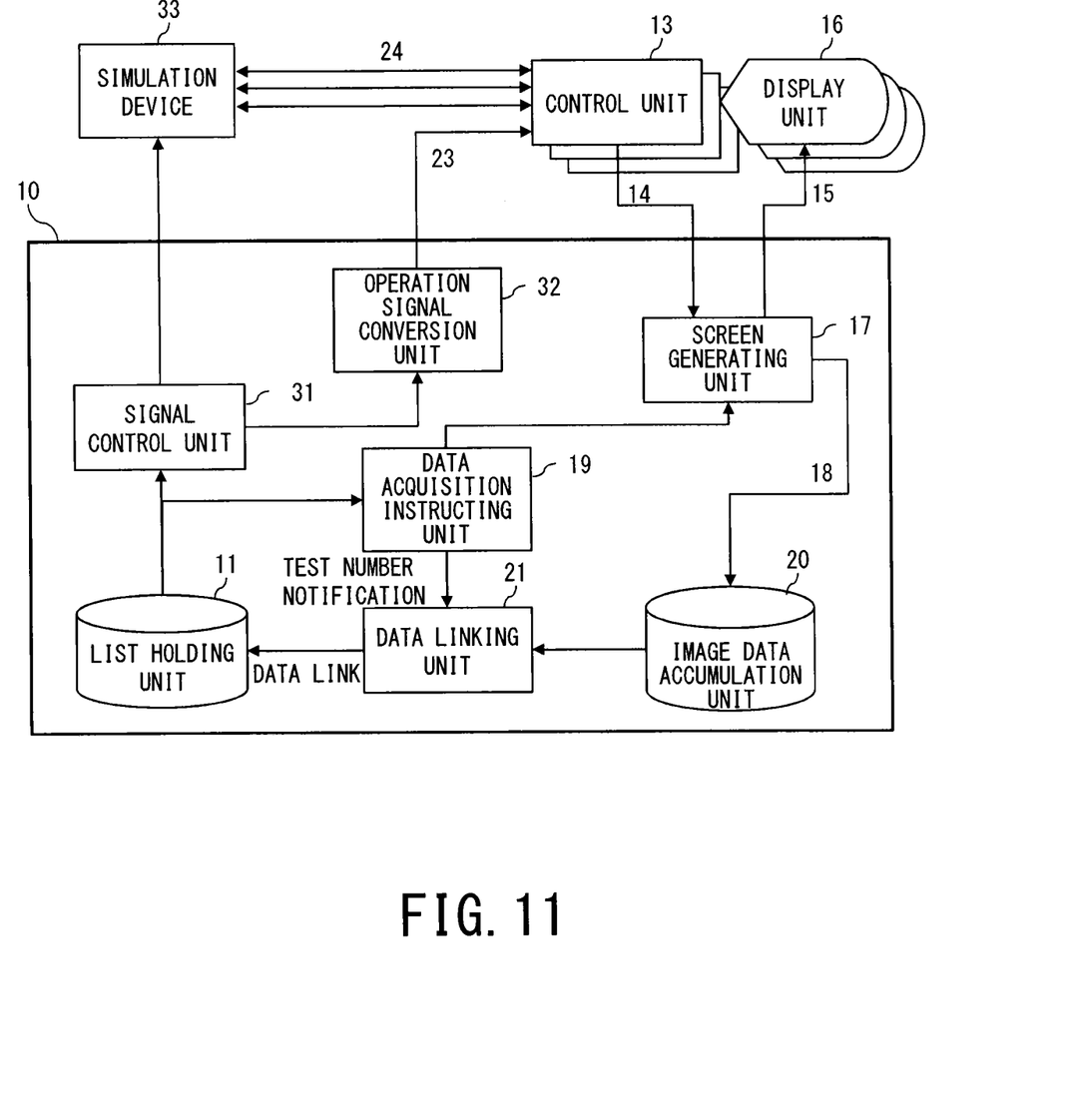
FIG. 11 is a block diagram showing a test support apparatus for a plant monitoring system according to a sixth embodiment of the present invention.

As shown in FIG. 11, in a test support apparatus 10 for a plant monitoring system according to a sixth embodiment, the list holding unit 11 holds a device operation list (not shown) which describes device operation information about a simulation device 33 by associating the device operation list with the test items, where the simulation device 33 inputs and outputs the process signals 24 of plural devices 12 (see FIG. 1) on a simulation basis. Then, the signal control unit 31 outputs the device operation information to the simulation device 33 based on the testing sequence in the test list (FIG. 4) and thereby causes the simulation device 33 to input and output the process signals 24.

Note that in FIG. 11, common components or functions with FIG. 9 are denoted by the same reference numerals as the corresponding components or functions is FIG. 9, and redundant description thereof will be omitted. Also, although only one control unit 13 to be tested is illustrated in FIG. 11, there is no particular limit to the number of control units 13.

With this configuration, the process signals 24 inputted and outputted by actually connecting the devices 12 to the control units 13 in the first to fifth embodiments are inputted and outputted, in the sixth embodiment, by connecting the devices 12 to the simulation device 33 which operates based on the device operation list (not shown).

For each test item, the device operation list (not shown) describes operation information (temperature signal, pressure signal, valve open/close signal, pump operation signal, and the like) used to identify operation of the simulation device 33 in relation to the test item.

Based on the testing sequence in the test list (FIG. 2) read from the list holding unit 11, the signal control unit 31 reads appropriate device operation information from the device operation list (not shown) and transfers the device operation information to the simulation device 33.

The simulation device 33 converts the transferred device operation information into an operation signal 23 readable by the control units 13 and sends the operation signal 23 to the control units 13.

Note that the data acquisition instructing unit 19 and operation signal conversion unit 32 operate in synchronization with the simulation device 33 in relation to a specified position in the testing sequence, and then the image data 18 of the display screen 15 displayed according to the device operation information links to the specified position in the testing sequence.

This allows operation of the simulation device 33 to be automated, making it possible to simplify examiners' work and thereby reduce testing time.

Figure 12:
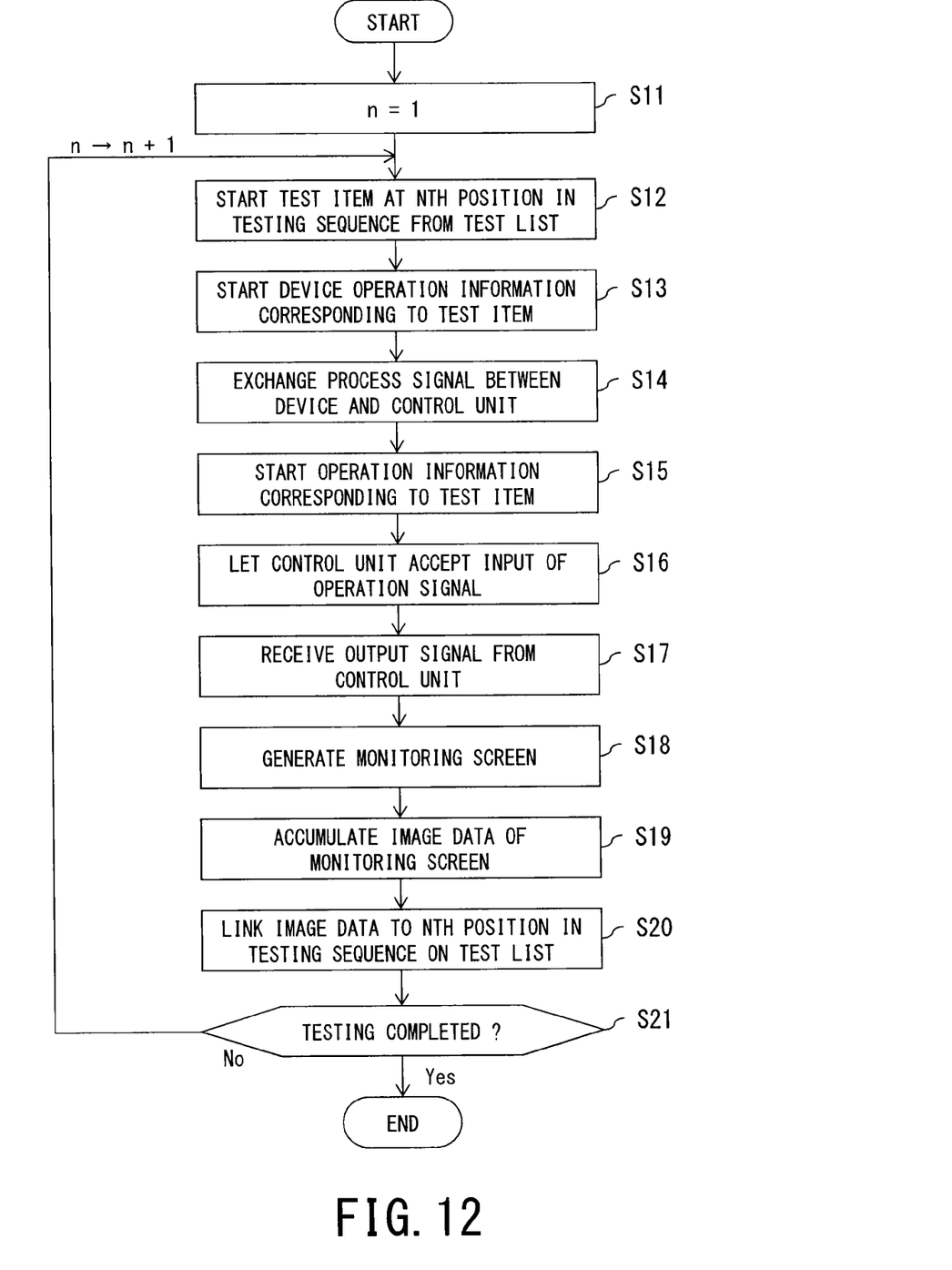
FIG. 12 is a flowchart describing embodiments of the test support method for a plant monitoring system.

A test support method for the plant monitoring system will be described with reference to a flowchart of FIG. 12.

First, a test item at an nth position (n=1) in the testing sequence is started from a test list (FIG. 2) (S11, S12). Next, the device operation information corresponding to the test item is started from the device operation list (not shown) (S13), and consequently the device 12 (or simulation device 33) and the control unit 13 start exchanging process signals 24 (S14).

Furthermore, the operation information corresponding to the test item is started from the operation list (FIG. 10) (S15), and the control unit 13 accepts input of the operation signal 23 (S16).

The output signal 14 of the control unit 13 is received (S17) and a display screen 15 (monitoring screen) is generated and displayed (S18).

On the other hand, a hard copy of the display screen 15 (monitoring screen) is taken, and the image data 18 is accumulated (S19) and linked to the nth position (n=1) in the testing sequence on the test list (FIG. 2) (S20).

The test number n is updated, flow from S12 to S20 is repeated (No in S21), and all test items are completed (Yes in S21, END).

The test support apparatus for a plant monitoring system according to at least one of the embodiments described above automatically links the image data of display screens to appropriate test items on the test list, thereby making it possible to efficiently obtain high-quality test results free of variations.

What is claimed is:

1. A test support apparatus for a plant monitoring system, comprising:

at least one programmed computer, wherein the programmed computer includes processing circuitry configured to hold a test list data sheet associated with a cell which describes at least a plurality of test items and information about a testing sequence for the test items;

generate display data for display on a display screen provided based on an output signal from a control unit external to the test support apparatus which inputs operation signals to control a plurality of connected devices, the display screen monitoring an operational status of the connected devices, the control unit being configured to be tested separately by being cut off from a network and configured to be outfitted with an operation signals input terminal;

give instructions to acquire image data of the display data displayed on the display screen generated by the inputted operation signals based on the test items according to the testing sequence in the test list, the image data being acquired based on display data displayed on the display screen at each position in the testing sequence;

give instructions to cause a camera to acquire photographic data corresponding to the testing sequence in the test list; and accumulate the image data and photographic data and assign, for each respective position in the testing sequence, an identification ID associated with the position in the testing sequence; and link the acquired image data and the photographic data to the test items on the test list using the assigned identification ID to generate the test list data sheet, each ordinal position in the testing sequence being associated with the cell describing the test item and a cell for use to link the image data.

2. The test support apparatus for a plant monitoring system according to claim 1, wherein:
the display data is provided for each of a plurality of the control units;
the test list further describes the control unit to be tested; and
the circuitry causes the image data of the display screen to be acquired based on the testing sequence in the test list.

3. The test support apparatus for a plant monitoring system according to claim 1, wherein the circuitry is further configured to
to acquire the output signal which provides a basis for the display data, and
link the acquired output signal to the test items on the test list.

4. The test support apparatus for a plant monitoring system according to claim I, wherein the circuitry is further configured to
hold an operation list which describes operation information about the control units by associating the operation list with the test items, and
input an operation signal converted from the operation information to the control units based on the testing sequence in the test list.

5. The test support apparatus for a plant monitoring system according to claim 4, wherein the circuitry is further configured to:
hold a device operation list which describes device operation information about a simulation device by associating the device operation list with test items, where the simulation device inputs and outputs process signals of plural devices on a simulation basis; and
output the device operation information to the simulation device based on the testing sequence in the test list and thereby causes the simulation device to input and output the process signals.

6. The test support apparatus of claim 1, wherein the test list data sheet is used to provide test support technique to improve the monitoring of power plant systems via higher-quality test results.

7. A test support method for a plant monitoring system implemented by a test support apparatus, the test support method comprising:
holding a test list data sheet associated with a cell which describes at least a plurality of test items and information about a testing sequence for the test items;
generating data for display on a display screen provided based on an output signal from a control unit external to the test support apparatus which inputs operation signals to control a plurality of connected devices, the display screen monitoring operational status of the connected devices, the control unit being configured to be tested separately by being cut off from a network and configured to be outfitted with an operation signals input terminal;
giving instructions to acquire image data of the display data displayed on the display screen generated by the inputted generated operation signals based on the test items according to the testing sequence in the test list, the image data being acquired based on display data displayed on the display screen at each position in the testing sequence;
giving instructions to cause a camera to acquire photographic data corresponding to the testing sequence in the test list;
accumulating, via processing circuitry, the image data and the photographic data and assigning, for each respective position in the testing sequence, an identification ID associated with the position in the testing sequence; and
linking the acquired image data and the photorgraphic data to the test items on the test list using the assigned identification ID to generate the test list data sheet, each ordinal position in the testing sequence being associated with the cell describing the test item and a cell for use to link the image data.

8. A non-transitory computer program product having a non-transitory computer-readable medium containing a test support program for a plant monitoring system, the test support program being configured to make a test support apparatus carry out a method of:
holding a test list data sheet associated with a cell which describes at least a plurality of test items and information about a testing sequence for the test items;
generating data for display on a display screen provided based on an output signal from a control unit external to the test support apparatus which inputs operation signals to control a plurality of connected devices, the display screen monitoring operational status of the connected devices, the control unit being configured to be tested separately by being cut off from a network and configured to be outfitted with an operation signals input terminal;
giving instructions to acquire image data of the display data displayed on the display screen generated by the inputted generated operation based on the test items according to the testing sequence in the test list, the image data being acquired based on display data displayed on the display screen at each position in the testing sequence;
giving instructions to cause a camera to acquire photographic data corresponding to the testing sequence in the test list;
accumulating the image data and photographic data and assigning, for each respective position in the testing sequence, an identification ID associated with the position in the testing sequence; and
linking the acquired image data and photographic data to the test items on the test list using the assigned identification ID to generate the test list data sheet, each ordinal position in the testing sequence being associated with the cell describing the test item and a cell for use to link the image data.

* * * * *